United States Patent [19]
Wolfington

[11] Patent Number: 5,394,612
[45] Date of Patent: Mar. 7, 1995

[54] BRUSH AND WEED CUTTER BLADE

[76] Inventor: Donald W. Wolfington, 2618 Anderson Creek Rd., Talent, Oreg. 97540

[21] Appl. No.: 191,168

[22] Filed: Feb. 3, 1994

[51] Int. Cl.$^6$ .................... A01D 55/00; B26B 25/00
[52] U.S. Cl. .......................... 30/347; 30/276; 56/255; 56/295
[58] Field of Search ............ 30/276, 347, 299, 302, 30/303, 307, 304; 56/255, 295, 12.7

[56] References Cited

U.S. PATENT DOCUMENTS

| | | | |
|---|---|---|---|
| 1,186,880 | 6/1916 | Canda | 30/347 X |
| 3,077,664 | 2/1963 | Murawski | 30/276 |
| 3,453,732 | 7/1969 | Wilkin | 30/296 |
| 3,781,991 | 1/1974 | Stretton | 30/276 |
| 3,788,050 | 1/1974 | Houst et al. | 30/347 X |
| 3,877,146 | 4/1975 | Pittinger | 30/276 |
| 4,027,389 | 6/1977 | Atchisson | 30/303 |
| 4,237,610 | 12/1980 | Bradus et al. | 30/276 |
| 4,249,310 | 2/1981 | Secoura et al. | 30/276 |
| 4,250,621 | 2/1981 | Houle | 30/347 |
| 4,302,878 | 12/1981 | Bonforte | 30/347 |
| 4,628,672 | 12/1986 | Jones | 30/347 X |
| 4,856,194 | 8/1989 | Lee | 30/276 |
| 4,881,363 | 11/1989 | Terai et al. | 30/276 X |
| 5,287,686 | 2/1994 | Lindsay | 30/347 X |

FOREIGN PATENT DOCUMENTS

| | | | |
|---|---|---|---|
| 118247 | 6/1968 | United Kingdom | 30/276 |

*Primary Examiner*—Rinaldi I. Rada
*Attorney, Agent, or Firm*—Eugene M. Eckelman

[57] ABSTRACT

A cutter blade has a body portion with a central attaching hole for removable attachment to an output end of a powered tool. The blade has a pair of oppositely extending ends with beveled cutting edges on their leading edges. The body and end portions of the blade are curved upwardly for increasing the efficiency in the cutting operation of the blade. It is preferred that the radius of curvature of the blade be approximately 30 inches and that the sharpening bevels on the leading edges extend from a point adjacent the mid point of the blade to the tips of the blade. The cutting edges are progressively narrower from the mid point to the tips for increased cutting efficiency and blade strength. The cutter blade also has clearance bevels on the lower surface thereof at the trailing edges of the end portions. These clearance bevels extend from an inner area of the body portion short of the mid point of the blade to the respective tips.

10 Claims, 2 Drawing Sheets

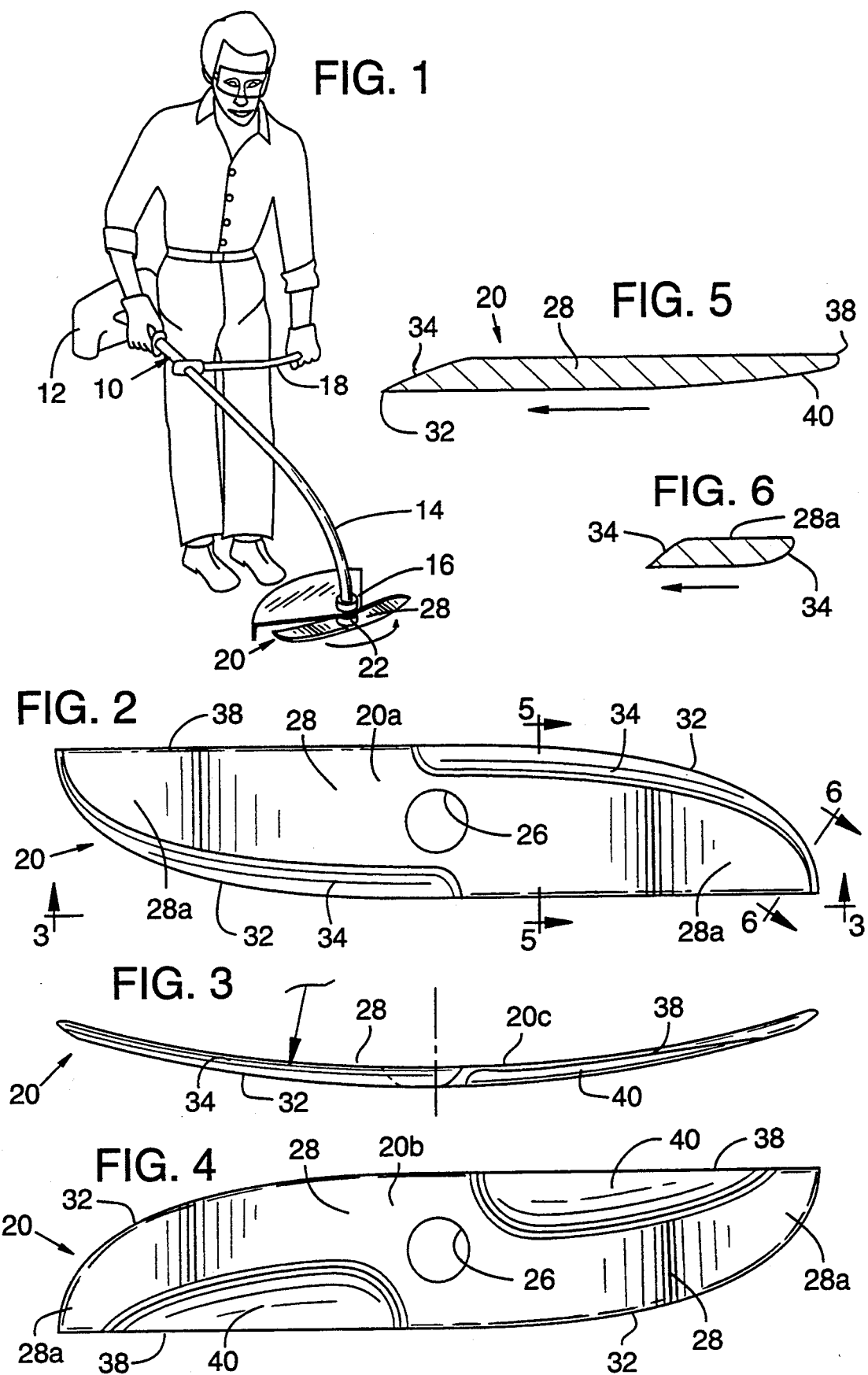

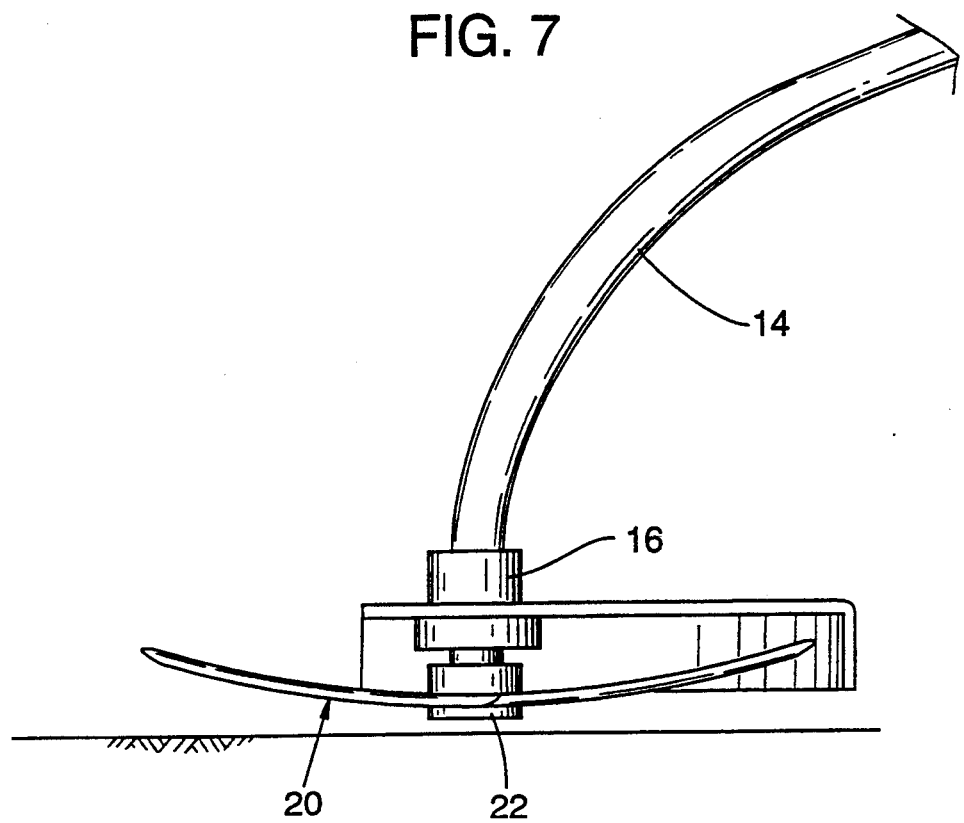
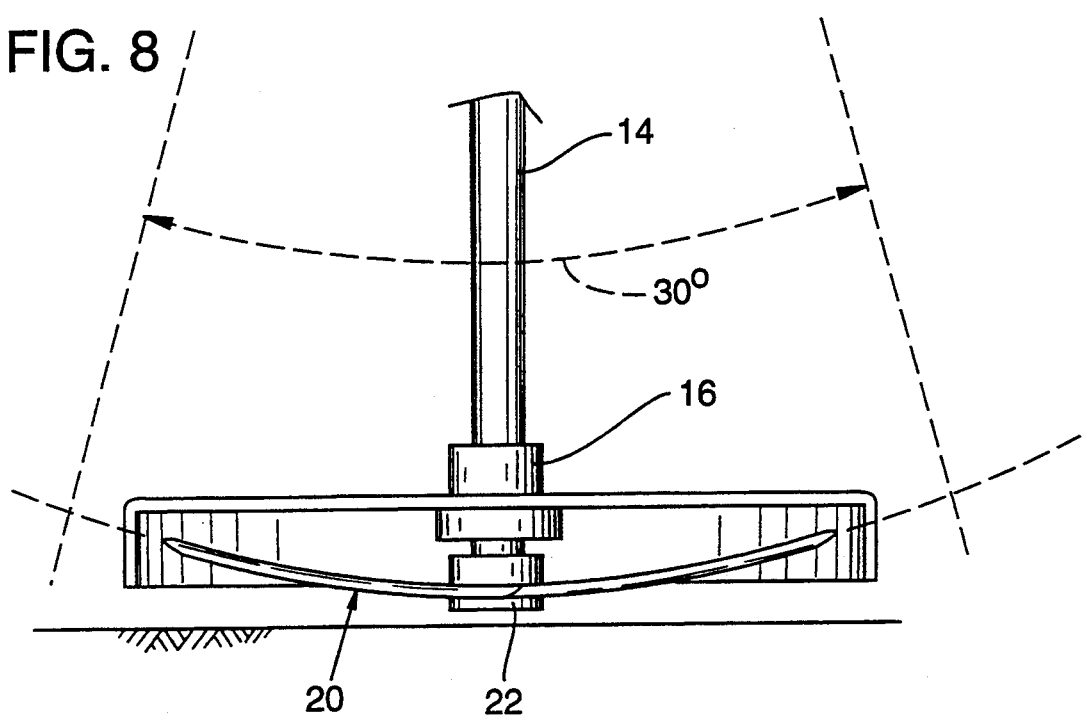

BRUSH AND WEED CUTTER BLADE

This invention relates to new and useful improvements in brush and weed cutter blades.

Brush and weed cutter blades have heretofore been provided. Such blades are used with tools that comprise a power unit, usually a small internal combustion engine, an elongated housed shaft extending downwardly from the power unit, and an arbor at the bottom to which the cutter blade is attached. The blades are driven by the shaft through suitable gearing in an arrangement wherein the blades are on approximately a vertical axis. Devices of this type are illustrated in U.S. Pat. Nos. 3,453,732; 3,781,991; 3,877,146; 4,302,878 and 4,856,194.

SUMMARY OF THE INVENTION

It is an object of the present invention to provide improvements in a cutter blade for brush and weed cutting tools of the type listed above.

More particular objects are to provide such a blade that is extremely efficient in cutting brush and weeds, particularly brush, and furthermore to provide a blade that is extremely strong and rugged in use and light in weight.

In carrying out the objects of the invention, a cutter blade is provided for use with the power means of the type having a downwardly extending shaft and a substantially vertical output arbor. The cutter blade has a body portion with upper and lower surfaces and central attaching means for removable attachment to the arbor of the powered shaft. A pair of oppositely extending portions project from the body portion and have leading and trailing edges. The leading cutting edges are beveled to sharpened edges. The body and end portions of the blade are curved upwardly in an arcuate contour. This contour is of approximately a 30 inch radius whereby to substantially assume the arc of movement of an operator in back and forth swinging movements. The cutting edges on the leading edges extend from a point adjacent the longitudinal center of the blade to the tip ends, and these cutting edges have a progressively narrowing dimension from the center to the tips. The cutter blade has clearance bevels on the trailing edges which extend from an inner area of the body portion to the tip ends. A central area of the blade is thickened relative to the end portions to contribute to blade strength.

The invention will be better understood and additional objects and advantages will become apparent from the following description taken in connection with the accompanying drawings.

BRIEF DESCRIPTION OF THE DRAWINGS

FIG. 1 is a perspective view of a conventional brush and weed cutting tool in operation and having the present blade mounted thereon.

FIG. 2 is a top plan view of the present blade.

FIG. 3 is an edge view taken on the line 3—3 of FIG. 2.

FIG. 4 is a bottom plan view;

FIGS. 5 and 6 are cross sectional views taken on the lines 5—5 and 6—6 of FIG. 2, respectively.

FIG. 7 is an enlarged side elevational view showing the blade in the position of most frequent use, and FIG. 8 is a diagrammatic front view of the blade showing its curvature as associated with a natural side to side swinging movement of the tool in a cutting operation.

DETAILED DESCRIPTION OF A PREFERRED EMBODIMENT

With particular reference to FIG. 1, the numeral 10 designates a conventional power tool and the numeral 12 designates the power unit for the tool. This power unit has an elongated housing 14 for a drive shaft terminating at the bottom in an arbor 16. Suitable handle means 18 are usually employed for manual operating movement of the tool.

The blade 20 of the invention is a single acting blade and has upper and lower surfaces 20a and 20b respectively. It is secured to the arbor by a nut 22, and has a central aperture 26 for this purpose. The shape of the blade as viewed in plan is seen in FIGS. 2 and 4 and edgewise in FIG. 3. The blade comprises a narrow elongated plate-like body portion 28 with oppositely extending end portions 28a having cutting edges 32. These cutting edges extend from the longitudinal center of the blade to a tip end in a shape approximating that of one side of a hyperbola. The cutting edges are formed by bevels 34 ground in the top surface 20a. The width of the bevels reduces progressively from the center of the blade to the outer tip, thus making a strong tip end. These bevels, in addition to making strong blade tips, provide laterally wide sharp cutting edge portions inwardly of the tips for efficiency in cutting at those portions that take the heaviest load.

The blade has straight trailing edges 38 laterally across from the cutting edges 32. The bottom surface 20b of the blade has opposite bevels 40 at these trailing edges. These bevels extend outwardly from a point just short of the center of the blade to a point spaced a short distance from the tip. Such bevels are not for sharpening the trailing edges but are laterally elongated, FIG. 5, which as will be seen in greater detail hereinafter, serve to provide clearance areas for brush or grass in the cutting function. As seen in FIG. 3, the central or intermediate body portion 20c of the blade is slightly thickened relative to the outer end portions. This thickened portion tapers gradually to a lesser thickness toward the ends. Such provides a strong and rugged body portion which acts like a flywheel by maintaining uniformity and balance in motion, wherein when the blade strikes thick or hard material the force of the blade continues through the object with little interruption or slowing of the RPM. Without this flywheel effect brought about by the central weight of the body portion the operator 7ould be forced to back off the blade from the material being cut in order to bring the RPM's back up to speed.

The blade as seen in an edge view, FIG. 3, is contoured to have an upwardly facing arcuate shape from tip to tip. This arcuate or concaved shape lets the operator swing the tool in side to side arc which is a natural swinging movement when cutting light underbrush or grass. A curvature having approximately a 30 inch radius is preferred. This radius is illustrated in FIG. 8. Also, with such curvature, the blade works against the material being cut in an uneven cutting surface and will not tend to slow down when coming against heavy or thick material. Also, the curvature throws the cut material downwardly and radially out of the way so that it operates without being hindered by material already cut. Also, the operating ends of the curved blade point up sufficiently to prevent digging into the ground or hanging up on articles on the ground. The widening and full half length bevels 34 provide an extremely efficient sharpened edge. On the other hand, the progressive narrowing of these bevels toward the tip, while cutting down somewhat the cutting efficiency of the edge 32 at the tip, nevertheless performs satisfactorily and at the same time maintains a strong outer tip area. The thickened central or intermediate portion 20c of the blade provides the flywheel, hammer effect when striking the material being cut, thus adding to the force produced by the motor plus it contributes to a strong and substantially fail-proof body portion.

The clearance tapers 40 contribute importantly to the cutting efficiency of the tool. That is, as the cutting edge 32 of the blade cuts through stalks or stems, these stalks or stems bend over slightly. The clearance tapers 40 reduce the friction of the cut ends against the bottom surface since they allow such cut ends to straighten back up in preparation for a perpendicular cut from the cutting edges of the blade. This straightening up of the stalks or stems places them in the path of the following cutting edge which without the trailing bevel, the clean, clear cut could not be made. The bevels at 40 encourage the material to release and straighten up.

The present blade is particularly useful in reducing underbrush to shorter lengths as a result of the arc of the blade and trailing beveled edges 40. More particularly, the shape and structure of the blade allow it to be lowered down from an upper portion of the brush, either straight down or in a swinging motion, to gradually reduce the brush from the top and thus provide the short lengths of cut material. The bevels 40 greatly reduce the friction against the bottom surface of the blade. The upwardly curved or concave shape of the blade produces a downward thrust on the blade as it rotates. This tends to hold the tool during operation. Also, in the event that the blade accidentally comes loose from its spindle, it will drive itself downwardly to the ground with minimal possibility of injury to the operator.

It is to be understood that the form of my invention herein shown and described is to be taken as a preferred example of the same and that various changes in the shape, size and arrangement of parts may be resorted to without departing from the spirit of my invention, or the scope of the subjoined claims.

Having thus described my invention, I claim:

1. A cutter blade for use with power means of the type having a downwardly extending shaft and a substantially vertical output end, said blade comprising:

a single acting body portion having upper and lower surfaces and central attaching means for removable driving connection to an output end of a powered shaft, and a pair of oppositely extending end portions projecting from said body portion to tip ends, said end portions having leading and trailing edges, and cutting edges on said upper surface at the leading edges of said end portions, said body and end portions being arcuately curved upwardly from the center to the ends.

2. A cutter blade for use with power means of the type having a downwardly extending shaft and a substantially vertical output end, said blade comprising:

a body portion having upper and lower surfaces and central attaching means for removable driving connection to an output end of a power shaft, and a pair of oppositely extending end portions projecting from said body portion to tip ends, said end portions having leading and trailing edges, and cutting edges on said upper surface at the leading edges of said end portions, said body and end portions being arcuately curved upwardly from the center to the ends, said body portion and said end portions being curved upwardly at substantially a uniform radius.

3. The cutter blade of claim 2 wherein said radius of curvature is approximately 30 inches.

4. The cutter blade of claim 2 wherein said cutting edges extend from a point adjacent the mid point of the blade to the respective tip ends.

5. The cutter blade of claim 4 wherein said cutting edges have a progressively narrower width from said mid point to said tips.

6. The cutter blade of claim 2 including clearance bevels on said lower surface at the trailing edges of said end portions.

7. The cutter blade of claim 6 wherein said clearance bevels on said trailing edges extend from an inner point of said body portion short of the mid point of the blade to the respective tip ends.

8. The cutter blade of claim 2 wherein said cutting edges extend from a point approximately adjacent the longitudinal center of the blade to the respective tip ends, and clearance bevels on said lower surface at the trailing edges of said end portions.

9. The cutter blade of claim 2 wherein said cutting edges extend from a point approximately adjacent the longitudinal of the blade to the respective tip ends, said cutting edges having a progressively narrower width from said center to said tips, and clearance bevels on said lower surface at the trailing edges of said end portions.

10. The cutter blade of claim 2 wherein a central area of said body portion is thickened relative to said end portions, said thickened central area tapering into said end portions in thinning relation wherein said blade acts as a flywheel for balanced and uniform cutting.

* * * * *